United States Patent
Kim et al.

(10) Patent No.: US 9,256,723 B2
(45) Date of Patent: Feb. 9, 2016

(54) SECURITY KEY USING MULTI-OTP, SECURITY SERVICE APPARATUS, SECURITY SYSTEM

(71) Applicant: SaferZone, Daejeon (KR)

(72) Inventors: Chul Su Kim, Daejeon (KR); Jae Sik Choi, Daejeon (KR)

(73) Assignee: SAFERZONE, Daejeon (KR)

( * ) Notice: Subject to any disclaimer, the term of this patent is extended or adjusted under 35 U.S.C. 154(b) by 0 days.

(21) Appl. No.: 14/132,064

(22) Filed: Dec. 18, 2013

(65) Prior Publication Data
US 2015/0169860 A1 Jun. 18, 2015

(30) Foreign Application Priority Data

Dec. 13, 2013 (KR) .................. 10-2013-0155855

(51) Int. Cl.
*G06F 21/34* (2013.01)
*G06F 21/32* (2013.01)
*G06F 21/81* (2013.01)

(52) U.S. Cl.
CPC .............. *G06F 21/34* (2013.01); *G06F 21/32* (2013.01); *G06F 21/81* (2013.01)

(58) Field of Classification Search
CPC .............. H04L 63/0838; H04L 9/3228; H04L 63/0853; H04L 9/3234; H04L 9/0863; G06F 21/34; G06F 21/31; G06F 21/32; G06F 21/81
See application file for complete search history.

(56) References Cited

U.S. PATENT DOCUMENTS

| 8,572,684 B1* | 10/2013 | Sama ................................. 726/2 |
| 2007/0011724 A1* | 1/2007 | Gonzalez et al. ................. 726/4 |
| 2007/0118891 A1* | 5/2007 | Buer ................................. 726/8 |
| 2007/0234064 A1* | 10/2007 | Nihei ........................... 713/183 |
| 2008/0034216 A1* | 2/2008 | Law ...................... H04L 9/3273 713/183 |
| 2009/0119754 A1* | 5/2009 | Schubert ............. H04L 63/0853 726/4 |
| 2010/0229227 A1* | 9/2010 | Andre ................... H04L 9/3228 726/6 |

(Continued)

FOREIGN PATENT DOCUMENTS

| KR | 10-2009-0022425 | 3/2009 |
| KR | 10-0972152 | 7/2010 |
| KR | 10-1086236 B1 | 9/2010 |

OTHER PUBLICATIONS

D. MRaihi, S. Machani, M. Pei, J. Rydell: "TOTP: Time-based one-time password algorithm", RFC6238, IETF, 2011.*

*Primary Examiner* — Catherine Thiaw
(74) *Attorney, Agent, or Firm* — Paratus Law Group, PLLC (57) ABSTRACT

A security key including an interface unit that provides an interface with an authentication device installed at a security domain; and an OTP module that communicates with the authentication device through the interface unit mentioned above, wherein the OTP module includes a storage unit that stores at least one OTP Seed ID and OTP Algorithm ID; and an OTP generation unit that generates an OTP by using an OTP Seed value and OTP algorithm that are identified by an OTP Seed ID and an OTP Algorithm ID matching with the OTP Seed ID and OTP Algorithm ID included in the OTP request message, which is received from the authentication device among the OTP Seed ID and OTP Algorithm ID stored in the storage unit, and provides the authentication device with the OTP generated in the process.

14 Claims, 7 Drawing Sheets

(56) References Cited

U.S. PATENT DOCUMENTS

| | | |
|---|---|---|
| 2011/0173684 A1* | 7/2011 | Hurry et al. ............... 726/6 |
| 2011/0307699 A1* | 12/2011 | Fielder ..................... 713/172 |
| 2012/0131331 A1* | 5/2012 | Benson ..................... 713/155 |
| 2013/0124855 A1* | 5/2013 | Varadarajan et al. ....... 713/155 |
| 2013/0185778 A1* | 7/2013 | Tamai et al. ............... 726/6 |
| 2013/0227661 A1* | 8/2013 | Gupta et al. ............... 726/6 |
| 2014/0040628 A1* | 2/2014 | Fort ..................... G06F 21/34 713/182 |
| 2014/0082717 A1* | 3/2014 | Kang et al. ............... 726/9 |
| 2014/0093144 A1* | 4/2014 | Feekes ..................... 382/124 |
| 2014/0109201 A1* | 4/2014 | Israel ..................... 726/5 |
| 2014/0259116 A1* | 9/2014 | Birk ..................... G06F 21/31 726/4 |
| 2015/0172282 A1* | 6/2015 | von Krogh ............... G06F 21/31 726/6 |

* cited by examiner

| Serial Number | OTP Seed ID | OTP Algorithm ID |
|---|---|---|
| 12345 | Seed 1 | T-OTP |
| | | E-OTP |
| | Seed 2 | T-OTP |
| | | E-OTP |
| | ⋮ | ⋮ |
| 12346 | Seed 1 | T-OTP |
| | | E-OTP |
| | Seed 2 | T-OTP |
| | | E-OTP |
| | ⋮ | ⋮ |
| ⋮ | ⋮ | ⋮ |

| Service URL | OTP Seed ID | OTP Algorithm ID |
|---|---|---|
| www.SaferZone1.com | SEED 1 | T-OTP |
| | | E-OTP |
| www.SaferZone2.com | SEED 2 | T-OTP |
| | | E-OTP |
| ⋮ | ⋮ | ⋮ |

FIG. 7

SECURITY KEY USING MULTI-OTP, SECURITY SERVICE APPARATUS, SECURITY SYSTEM

This application claims priority from Korean Patent Application No. 10-2013-0155855 filed on Dec. 13, 2013 in the Korean Intellectual Property Office, the disclosure of which is incorporated herein by reference in its entirety.

BACKGROUND OF THE INVENTION

1. Field of the Invention

This invention is about the security key, security service device and security system, to which a Multi One-time Password is applied.

2. Description of the Related Art

In general, an access control system is installed to protect lives, properties and information at a specific place such as buildings, research institutes, factories, offices and other security areas, where approaching persons shall be under control.

In the traditional access control system, a person entering a door was authenticated by a password or access card, of which the information is inputted into an authentication terminal installed at the side of the door, and when the authentication was confirmed the door was opened.

The downside of the system was that the information leak of passwords could easily occur, and it was troublesome to input the password. On the other hand, the problem regarding an access card was that it could be duplicated with ease. In short, the problem of existing access control system is its security fragility.

In order to make up for such weak points, the Patent Registration No. 1086236 in Korea has released the access control system based on the multi one-time password. To put it concretely, the Patent Registration No. 1086236 has stipulated the stages of access control system, which include (a) the stage where the reading device authenticates the smart card primarily by using the card security key received from the smart card mounted on the mobile terminal equipment and the authentication security key received from the access control server, (b) the stage where the single-use password generated by the above mentioned access control server is transmitted to the mobile terminal unit after the success in the primary authentication, and (c) the stage where the secondary authentication of above mentioned smart card is carried out by using the single-use password generated by the above mentioned reading device and the single-use password of the card, which has been received from the card mentioned above.

The Patent Registration No. 1086236 has the merit that the security has been improved by using the One Time Password. However, the weak point of the Korean Patent No. 1086236 is that it is impossible to control the access to various security areas because the authentication is carried out by using a single OTP method. And also, in the case of Korean Patent No. 1086236, it is difficult to prevent a person, who has acquired a smart card lost by somebody else, from trespassing into a security area.

SUMMARY OF THE INVENTION

According to an aspect of the present invention, there is provided a security key comprising: an interface unit that provides an interface with an authentication device installed at a security domain; and an OTP module that communicates with the authentication device through the interface unit, wherein the OTP module includes a storage unit that stores at least one OTP Seed ID and OTP Algorithm ID; and an OTP generation unit that generates an OTP by using an OTP Seed value and OTP algorithm that are identified by an OTP Seed ID and an OTP Algorithm ID matching with the OTP Seed ID and OTP Algorithm ID included in the OTP request message, which is received from the authentication device among the OTP Seed ID and OTP Algorithm ID stored in the storage unit, and provides the authentication device with the OTP generated in the process.

According to an aspect of the present invention, there is provided a security service device comprising: an ID generating unit that generates OTP Seed ID and OTP Algorithm ID that is used when a authentication device installed at least one security domain requests an OTP randomly in a pre-established cycle and provides the authentication device with the OTP Seed ID and OTP Algorithm ID; and an authentication requesting unit, wherein the authentication requesting unit is provided with time information and an OTP received from the security key in response to the supply of OTP Seed ID and OTP Algorithm ID from the authentication device, finds out OTP Seed ID and OTP Algorithm ID that are used when generating the OTP received by using the time information, and request an authentication at an OTP authentication server—the authentication requesting unit provides the OTP generated by the security key, and the found OTP Seed ID and OTP Algorithm ID in the OTP authentication server when an authentication is requested.

According to an aspect of the present invention, there is provided a security system comprising: an OTP data base that stores the OTP Seed ID and OTP Algorithm ID for each security key; and an OTP authentication server that authenticates a first OTP by using a second OTP after generating the second OTP by using OTP Seed value and OTP Algorithm which are identified by an OTP Seed ID and OTP Algorithm ID that matches with a security key identification information, OTP Seed ID and OTP Algorithm ID which are included in an authentication request message in the OTP data base when receiving the authentication request message including the security key identification information, the OTP Seed ID, the OTP Algorithm ID and the first OTP generated by the security key, which is identified by the security key identification information.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

This invention facilitates various alterations and many practical examples, so that some specific cases are illustrated in the figures and the details of figures will be explained. However, it is not intended to limit this invention to a certain type of practices, but it shall be understood as aggregation of all the alteration, corresponding items or substitutes that belong to the idea and technology scope of this invention.

Figure 1:
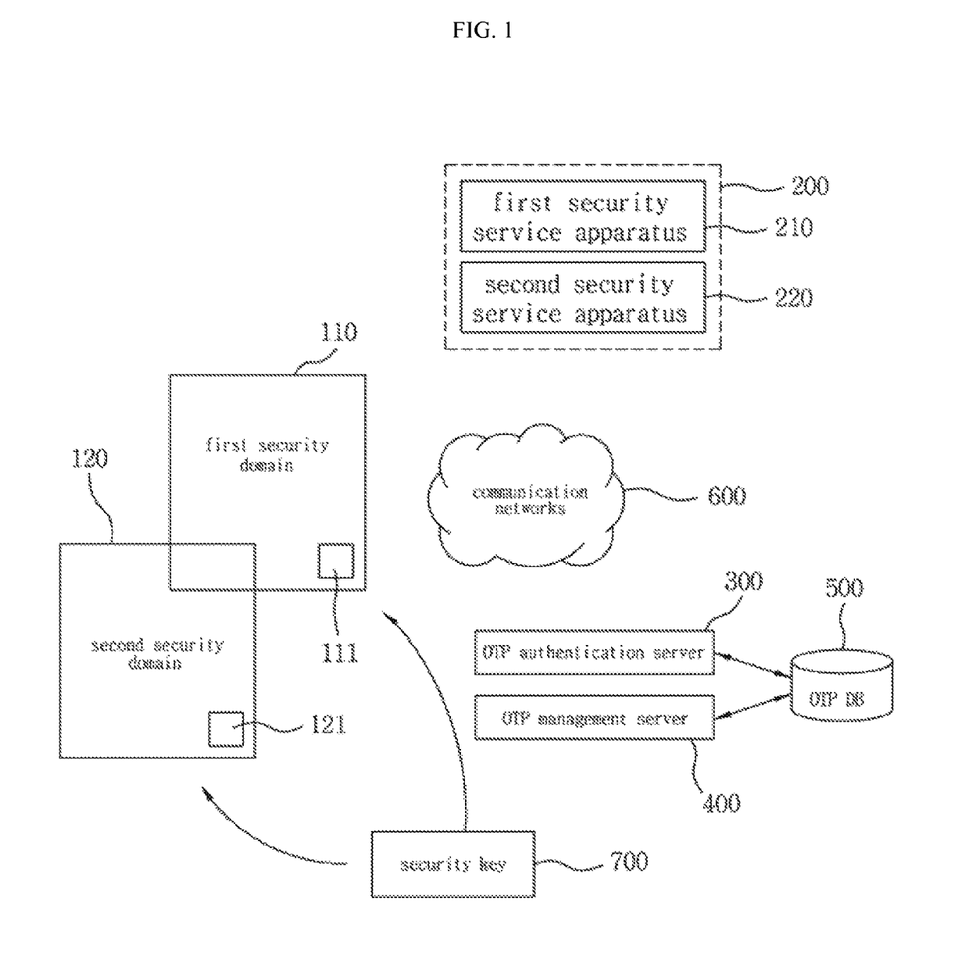
FIG. 1 shows a figure that illustrates the security system according to a practical example based on this invention.
Figure 2:
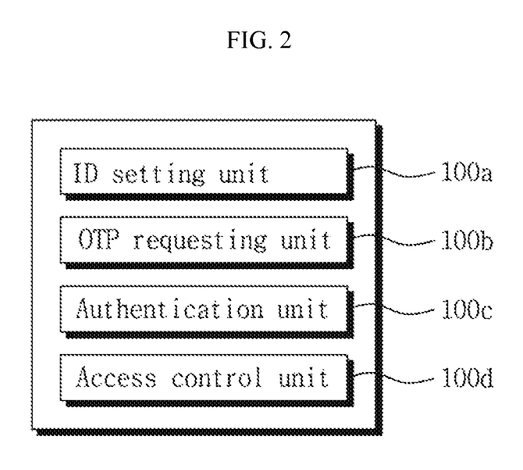
FIG. 2 illustrates a functional block diagram of the authentication device introduced in FIG. 1.
Figure 3:
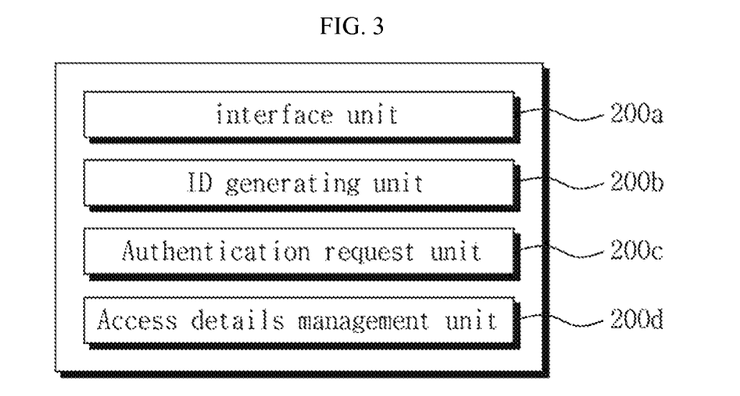
FIG. 3 illustrates a functional block diagram of security service system introduced in FIG. 1.
Figure 4:
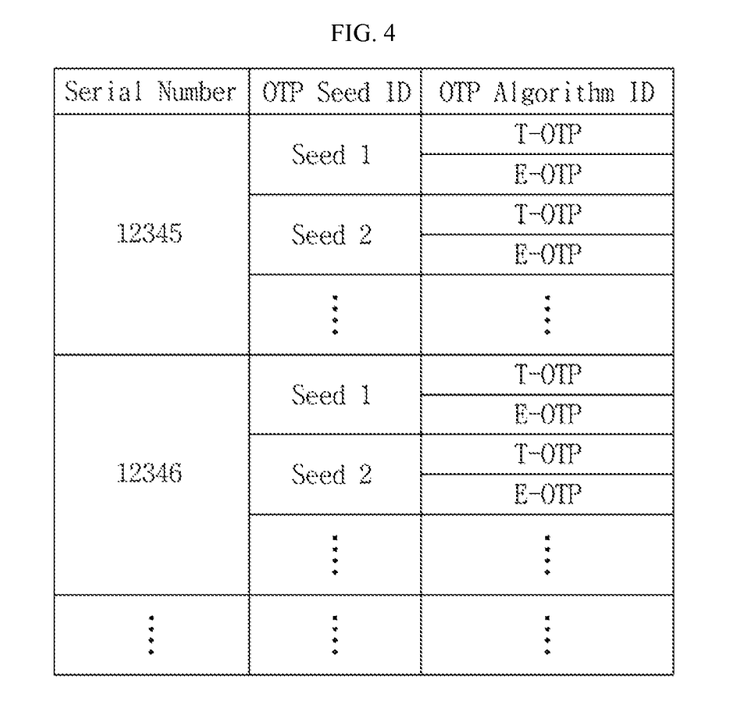
FIG. 4 illustrates information stored in the OTP DB.
Figure 5:
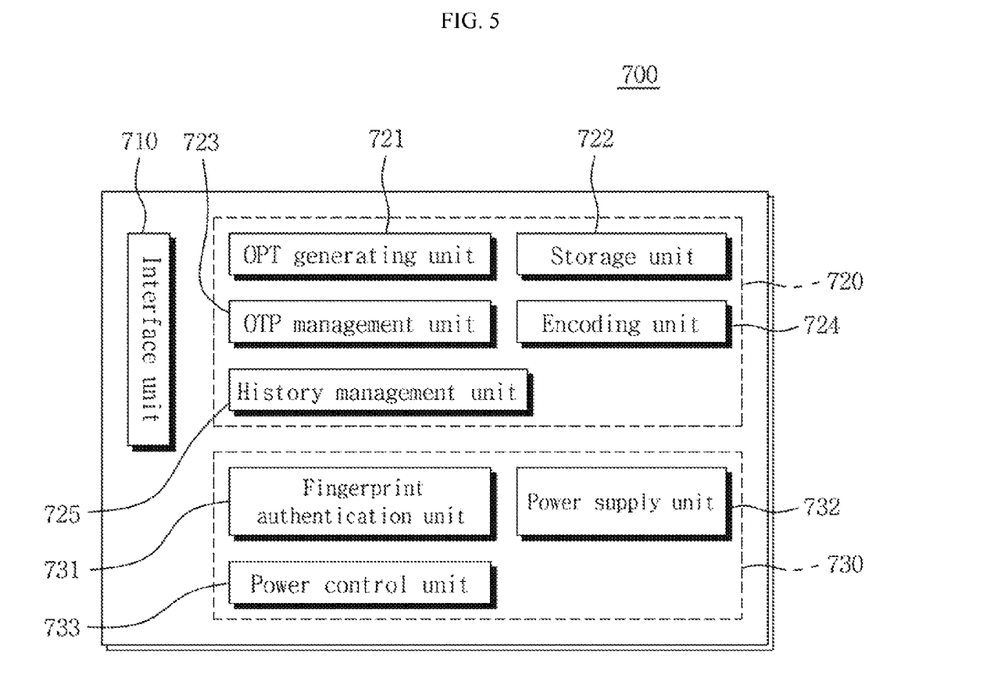
FIG. 5 illustrates a functional block diagram of the security key introduced in FIG. 1.
Figure 6:
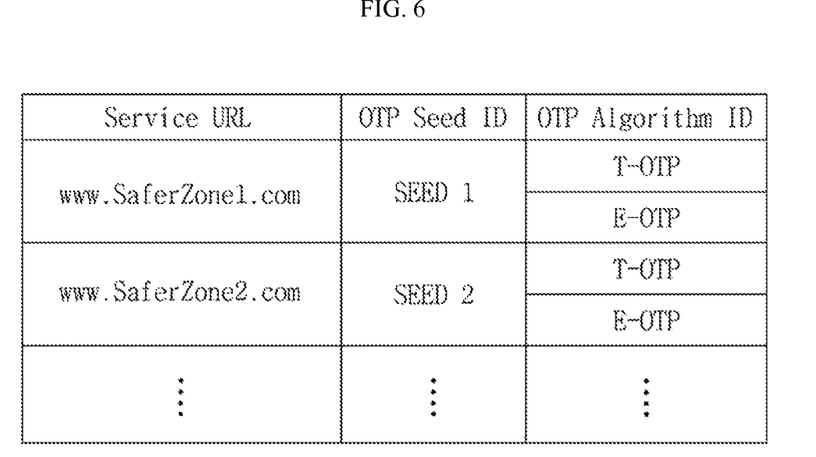
FIG. 6 illustrates information stored in the storage device introduce in FIG. 5.

According to FIGS. 1 and 6 attached to this statement, the security system to which the security key in this invention will explained below. FIG. 1 shows a figure that illustrates the security system according to a practical example based on this invention. FIG. 2 illustrates a functional block diagram of the authentication device introduced in FIG. 1. FIG. 3 illustrates a functional block diagram of security service system introduced in FIG. 1. FIG. 4 illustrates information stored in the OTP DB. FIG. 5 illustrates a functional block diagram of the security key introduced in FIG. 1. FIG. 6 illustrates information stored in the storage device introduce in FIG. 5. In order to make the gist of invention clear explanation of the well-understood things will be omitted or simplified.

According to FIG. 1, the security system may include the multiple security domains (110, 120). In this regard, the security domain may be either a physical security domain or a logical security domain. And the physical security domain may be a physical space such as a reference room and a computer room, the security is maintained, and the logical security domain may be a logical space such as an in-company LAN (Local Area Network). Of course, the logical security domain may refer to a specific works on PCs such as print works on the PC and memory storage in an external hard drive. The following is the explanation of the case where there are two security domains. It is natural that the kinds and number of security domains may be changed according to the intention of security designer.

The first authentication device (111) and the second authentication device can be installed at the first security domain (110) and the second security domain (120) respectively. The authentication device (111, 121) can allow or deny the access (in other words, allowing or suspending a specific operation on a PC) to the security domain (110, 120) through the authentication procedure. The authentication device (111, 121) is made by using a separate module to be installed in the security domain, or it may be mounted on the PC in a type of application. In the case in which an authentication device allows or denies the access to the logical security domain, the authentication device may be mounted on a PC in a type of application.

According to FIG. 2, each authentication device (111, 121) can include an ID setting unit (100a), OTP requesting unit (100b), authentication unit (100c) and access management unit (100d).

The ID setting unit (100a) can receive the OTP Seed ID and OTP Algorithm ID from the interlocking security service device in a pre-established cycle. And also, whenever the ID setting unit (100a) receives the OTP Seed ID and OTP Algorithm ID, it can update the OTP Seed ID and OTP Algorithm ID, which will be used when the authentication device requests an OTP from the security key.

The OTP requesting unit many transmit the OTP requesting message, including identification information of security service and the OTP Seed ID and OTP Algorithm ID, to the security key (700). At this time, if the OTP algorithm identified by the OTP Algorithm ID is based on the time, the security key (700) may be provided with time information. Unlike this, if the OTP algorithm identified by the OTP Algorithm ID is based on an event, the provision of event information can be omitted. As everyone knows, the event information can be managed on the security key (700) by the RTC (Real Time Clock) chip mounted on the security key (700).

And if the error of event exceeds the pre-established set point when carrying out authentication, the event information of the security key (700) that is managed at the OTP DB can be corrected.

In response to the OTP request message, the authentication unit (100c) may request the interlocking security service device for an OTP authentication, of which the request received from the security key (700). In this regard, the authentication unit (100c) can transmit the first OTP authentication request message, which includes an OTP, to the security service device. At this time, security key identification information (for example, the serial number of security key), OTP and time information may be included in the first OTP authentication request message. And the time information may be used to find out the OTP SEED ID and OTP Algorithm ID, which are used by the security service device when it generates the OTP.

The access management unit (100d) may allow or deny the access to the security area when a person with the security key (700) requests access, according to the result of OTP authentication, of which the request has been received from the interlocking security service device.

The server group (200) may include at least two sets of security service devices. At this point, the security service may refer to a security service for a specific security area. In the following paragraphs, it is supposed that there are two sets of security service devices in a server group (200). The first security service device (210) may provide the first security domain (110) with security service, and the second security service device (220) may provide the second security domain (120) with security service. The first security service device (210) may interlock with the first authentication device (110), and the second security service device (220) may interlock with the second authentication device (121). Each security service device (210, 220) may take charge of security service for a single security domain or multiple security domains, and it may be interlocking with the authentication device installed on the relevant security domain.

According to FIG. 3, each security service device (210, 220) may include an interface unit (200a), ID generating unit (200b), authentication requesting unit (200c), and access management unit (200d).

The interface unit (200a) may provide the security administrator with an interface for management of security domain.

The ID generating unit (200b) generates random OTP Seed ID and OTP Algorithm ID in real time for each interlocking security domain, and it can also provide the authentication device with the OTP Seed ID and OTP Algorithm ID generated in the process. And at this time, the OTP Seed ID and OTP Algorithm ID are updated at every moment they are received by the authentication device, and the authentication device may include the updated OTP Seed ID and OTP Algorithm ID in the OTP requesting message. Meanwhile, the OTP Seed ID and OTP Algorithm ID which are provided by the ID generating unit (200b) to the authentication device may be identical with or different from those of the multiple authentication devices, which are interlocking with the security service device. The function that generates OTP Seed ID and OTP Algorithm ID may or may not include time information.

When receiving the first OTP authentication request message from the authentication device, the authentication requesting unit (200c) can decide whether the security key has been registered or not, (or whether the security key has access to the security domain or not) by using the identification information of the security key. And if the security key is a registered one, the authentication requesting unit (200c) can find out the OTP Seed ID and OTP Algorithm ID, which were used by the security key to generate the OTP, by using the time information included in the first OTP authentication request message. At this time, we may use a method, in which one of the OTP Seed ID and OTP Algorithm ID that have been arranged according to time is selected, or the other method, in which the OTP Seed ID and OTP Algorithm ID can be calculated by using an arithmetic operation method after applying the time to the algorithm that generates random OTP Seed ID and OTP Algorithm ID by using the time as variables. The authentication requesting unit (200c) can transmit the OTP Seed ID and OTP Algorithm ID, which have been found out on the basis of the time information received from the authentication device, including the second OTP authentication request message that contains the OTP and security identification information generated by the security key, to the OTP authentication server.

Every time the access management unit (200d) receives the first authentication request message, it may update the security key identification information (for example, a security key serial number), or the details of access to the security area (or attempts to enter the area) for each person carrying a security key.

When receiving the second OTP authentication request message, the OTP authentication server (300) may generate OTP by using OTP Seed value and OTP Algorithm which are identified by OTP Seed ID and OTP Algorithm ID that matches with the security key identification information, OTP Seed ID and OTP Algorithm ID which are included in the second OTP authentication request message in the OTP data base. And also, the OTP authentication server (300) may authenticate the OTP which is generated at the security key (700) by using the OTP generated in the process The OTP management server (400) can provide an interface between the OTP DB (500) and the security administrator. The security administrator can record the data such as Seed ID and OTP Algorithm ID retained by each security key, including the OTP Seed value and OTP algorithm that can be identified by the Seed ID and OTP Algorithm ID OTP, through the management server (400).

According to FIG. 4, the OTP DB (Data Database, 500) can store the Seed ID and OTP Algorithm ID by matching the data to the security key identification information (for example, a serial number of security key). At this point, the OTP Algorithm ID can be matched to each Seed ID to be stored, or it may be stored as it is separated from the Seed ID. The OT algorithm may be based on time or event.

And then, according to FIG. 1, the authentication device (111, 121), server group (200), OTP authentication server (300), OTP management server (400), and OTP DB (500) can carry out mutual communication through the communications network (600). This invention does not put restrictions on protocols applied to the communications network (600).

The security key (700) can generate an OTP that may have access to at least one security domain. This invention does not put restrictions on physical media on which a security key mounted. The security key may be produced in the types such as Smart Card type, USB type, USIM Chip type, and SD Card type.

According to FIG. 5, the security key (700) can include the interface unit (710), OTP module (720), and the fingerprint authentication module (730).

The interface unit (710) can provide interfacing the OTP module (720) and authentication device (111, 121). The interface unit (710) provides the communication between the authentication device (111, 121) and OTP module (720).

And here, the both wire and wireless communication can be used as the communication method. The communication methods such as USB, NFC, Bluetooth, and Wi-fi can be applied to this system. When the NFC or USB method is applied, it is not required to prepare power supply for the OTP module (720) operation as the operation power for the OTP module (720) is supplied through electromagnetic waves or a port. Unlike this, it may be required to supply the power for OTP module (720) operation on the security key (700), if the security key (700) is not supplied with power from outside.

The OTP module (720) can include the OTP generating unit (721), storage unit (722), OTP management unit (723), encoding unit (724), and the history management unit (725).

When receiving an OTP request message from the authentication device (111, 121), the OTP generating unit (721) can decide whether the OTP has been generated or not by using the service identification information which is included in the OTP request message. The OTP generating unit (721) may generate an OTP when a service identification information, which is matched with the service identification information, has been registered in the storage unit (722). However, if a service identification information, which is matched with the service identification information, has been not registered in the storage unit (722), the OTP generating unit (721) may not generate an OTP. The OTP generating unit (721) may generate an OTP by using the OTP Seed value and OTP algorithm that are identified by OTP Seed ID and OTP Algorithm ID, which are included in the OTP request message. And if the OTP algorithm is based on time, the time information contained in the OTP request message may be used. Unlike this, if the OTP algorithm is based on events, the event information managed by the OTP module (720) can be used. In this regard, the OTP module (720) can manage the event information by using a real time clock chip (RTC Chip).

According to FIG. 6, the storage unit (722) can store the security service identification information, OTP Seed ID, and OTP Algorithm ID. And here, the OTP Algorithm ID can be store as it is matched with the OTP Seed ID, or separated from the OTP Seed ID. And also, the storage unit (722) can store the OTP Seed value and OTP Algorithm that are identified by the OTP Seed ID and OTP Algorithm ID. An here, the OTP Algorithm can generate an OTP on the basis of either time or event Of course, the storage unit (722) can store one security service identification information, one OTP Seed ID, one OTP Algorithm ID, one OTP Seed vale and one OTP Algorithm, according to the access authority to the security domain. FIG. 6 illustrates a case in which a security service URL is applied as a security service identification information. This invention does not put restrictions on such security service identification information. For example, the information prepared at security administrator's own discretion can be used as security service identification information in order to specify an IP address of security service device, and security services.

The OTP management unit (723) provides the administrative function (such as deletion, storage, and memory assignment) regarding the security service identification information, OTP Seed ID, OTP Algorithm ID, OTP Seed value, and OTP algorithm, which are stored in the storage unit (722).

The encoding unit (724) can encrypt the data transmitted or received by the OTP module (720) automatically by using an encoding method such as AES/RSA method.

The history management unit (725) can manage the history of access to the security domain by using a security key. Whenever receiving an OTP request message, the history management unit (725) can update the history of access to the security domain. This invention does not put restrictions on the information of access history. For example, a security area list may be applied to an access based on a access history.

The fingerprint authentication module (730) can include the fingerprint authentication unit (731), electric power unit (732), and the power control unit (733).

The fingerprint authentication unit (731) may authenticate a fingerprint by comparing the fingerprint of security key holder, who has entered the fingerprint data, with the fingerprinted which has been already registered.

The electric power unit (732) supplies the operating power to the fingerprint module (730).

The power control unit (733) may block or allow the supply of data to the OTP module (720) according to the result of fingerprint authentication process. For this reason, the power control unit (733) may turn or off the switch installed on the power line (not presented in fitures) connected to the OTP module (720). When a fingerprint authentication is completed successfully, the switch is turned on, but unlike this, when the fingerprint authentication failed, the switch would be turned off.

Like mentioned above, this invention makes it possible to control access to various security domain by using the multiple OTP and classifying purposes of access.

And various details of access to security areas can be administered at the security key through the history management unit.

And this invention can prevent a person, who has acquired a smart card lost by somebody else, from trespassing into a security area by operating the OTP module after completion of fingerprint authentication procedure.

The rest of functions are available even when a part of functions of the security key is omitted, as far as the authentication method in which the multiple OTP has been used is maintained. For example, at least one the functions among the encoding unit, history management unit and fingerprint authentication module can be omitted.

Figure 7:
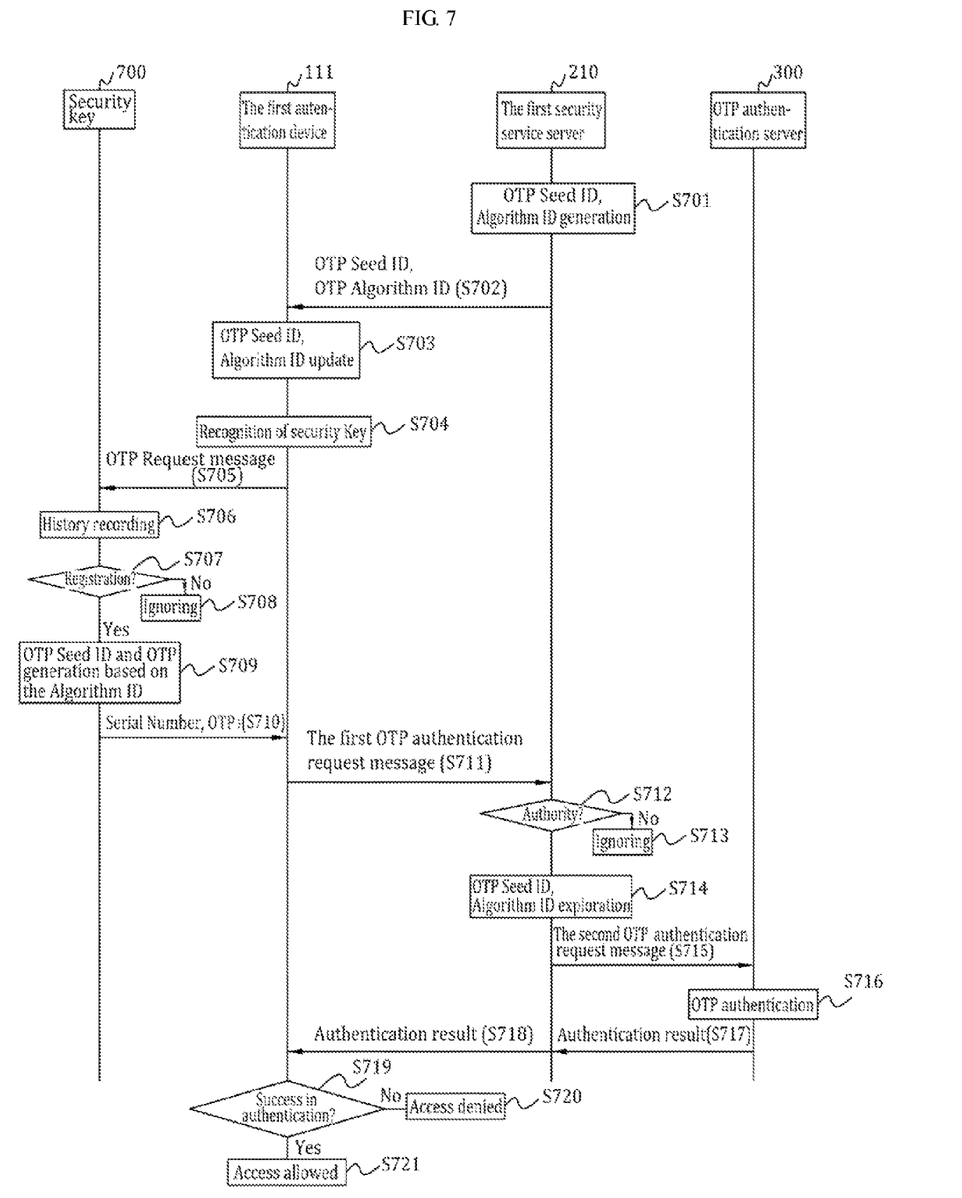
FIG. 7 illustrates a ladder chart presenting an authentication procedure in which the security key is used.

In the following paragraphs, the authentication procedure, in which the security key based on this invention is used, will be explained through referring to FIG. 1 or 7. FIG. 7 shows a ladder chart that represents the authentication procedure in which the security key based on this invention is applied. The configuration of security system will become more clear according to the following explanation. In the following paragraph, it is supposed that the authentication device is the first authentication device and the security service device is the first security service device.

First of all, the OTP Seed ID and OTP Algorithm ID for each security domain, which is interlocking with the ID generating unit (200b), can be generated randomly in real time (or according to the pre-established cycle) (S201). Here and now, the OTP Algorithm ID may be the information that indentifies the OTP algorithm generating the time or event-based OTP.

And the ID generating unit (200b) can provide the first authentication device (111) with the OTP Seed ID and OTP Algorithm ID, which has been generated at the S701 (S702). At this time, the ID setting unit (100a) can update the OTP Seed ID and OTP Algorithm ID that will be used when requesting an OTP into the OTP Seed ID and OTP Algorithm ID that have received from the S702 (S703). The S701 or S703 can be repeated according to the pre-established cycle, which is separated from a different stage.

And secondly, the first authentication device (111) can recognize the security key (700) (S704). When the Bluetooth method is applied, the first authentication device (111) recognizes the security key (700) through pairing, and at the same time a PAN (Personal Area Network) may be constructed between both sides. In the case of NFC method, the first authentication device (111) can recognize the security key (700) through tagging. And in the case of USB method, the first authentication device (111) can recognize by inserting the interface (710) in the USB port on the first authentication device (111).

The OTP requesting unit (100b) can transmit an OTP request message to the security key (700) that has been recognized (S705). The OTP request message may include the security service identification information, OTP Seed ID and OTP Algorithm ID. The security service identification information may be omitted from the OTP request message as the case may be. And when a time-based OTP algorithm is identified by the OTP Algorithm ID, the time information may be included in the OTP request message.

At this time, the history management unit (725) may record the history of security holder's attempts to enter the security domain by storing the security service identification information in time and sequence (S706).

Apart from the history management, the OTP generating unit (721) may decide whether the security service identification information included in the OTP request message is registered or not (S707). At this time, the OTP generating unit (721) may refer to the security service identification information stored in the storage unit (722).

When the security service identification information, which is stored in the storage unit, is recognized to be the one that has not been registered in the storage unit (702), the OTP generating unit (721) may ignore the OTP request message (S708).

Unlike this, when the security service identification information is recognized to be registered, the OTP generating unit (721) may generate an OTP by using the OTP Seed value and OTP algorithm, which are identified by the OTP Seed ID and OTP Algorithm ID included in the OTP request message (S709). At this time, if the OTP Algorithm is based on time, the time information received from the first authentication device (111) may be used. But if the OTP Algorithm is based on events, the event information (e.g. the count value which is used when the security key is applied to access) controlled by the OTP module itself And the OTP generating unit (721) may transmit the security key identification information (e.g. the serial number of security key), including the OTP generated in the S709 stage, to the first authentication device (111). At this time, the authentication unit (110c) may request an OTP authentication by transmitting the first OTP authentication request message to the first security service device (210) (S710, S711). The first OTP authentication request message may include the security identification information, and the OTP and time information generated at the S709.

The time information included in the first OTP authentication request message may be used to identify the time when the OTP was generated.

When receiving the first OTP authentication request message, the authentication requesting unit (200c) can decide whether the security key has been registered or not, (or whether the security key has access to the security domain or not) by using the identification information of the security key (S712). When the security key is recognized as an unregistered security key, the authentication requesting unit (200c) may ignore the authentication request (S713).

Unlike this, when the security key is recognized to be a registered one, the authentication requesting unit (200c) can find the OTP Seed ID and OTP Algorithm ID, which has been used by the security key when generating the OTP, by using the time information included in the first OTP authentication request message (S714). At this time, we may use a method, in which one of the OTP Seed ID and OTP Algorithm ID that have been arranged according to time is selected, or the other method, in which the OTP Seed ID and OTP Algorithm ID can be calculated by using an arithmetic operation method after applying the OTP Seed ID and OTP Algorithm ID to the algorithm that is generated randomly by using the time as variables.

And the authentication requesting unit (200c) can transmit the second OTP authentication request message, which contains the OTP Seed ID and OTP Algorithm ID identified at the S714, to the OTP authentication server (300) (S715). The second OTP authentication request message may include more security key identification information and the OTP generated at the S709.

At this time, the OTP authentication server (300) may generate OTP by using OTP Seed value and OTP Algorithm which are identified by OTP Seed ID and OTP Algorithm ID that matches with the security key identification information, OTP Seed ID and OTP Algorithm ID which are included in the second OTP authentication request message in the OTP data base. And also, the OTP authentication server (300) may authenticate the OTP which is generated at the security key (700) by using the OTP generated in the process (S716).

And the authentication result may be transmitted to the first authentication device (111) through the first security server (210) (S717, S718). At this time, if the authentication has failed, the access management unit (100d) may not allow the security key holder's access (S719, S720).

Unlike this, when an authentication has succeeded, the access management unit (100d) may allow the security key holder's access (or works) (S719, S721).

Besides the above mentioned stages, the fingerprint authentication procedure may proceed in the security key itself. If the fingerprint authentication has succeeded, the OTP module may be in an activated state (in other words, a state in which power supply is available or power is being supplied), and if the fingerprint authentication has failed, the OTP module may be in a non-activated state (in other words, a state in which power supply is not available). After the S706 stage mentioned above is based on the premise that the fingerprint authentication has been successfully carried out at the security key.

Some parts of the process in FIG. 7 may be omitted or carried out in a different order. The process can be carried out with the S706 omitted. And also, the S706 may be carried out after the S709.

The desirable and practical examples stated so far have been introduced in order to illustrate the purpose of this invention. Therefore, any business operator with general knowledge concerning this invention will be able to modify and change the contents or add relevant technology within the scope of ideas and technologies developed in this invention. So, such modifications, changes and additions must be regarded to belong to the scope of request for a patent.

What is claimed is:

1. A security key device communicating with an authentication device within a security domain, a security service device and a one time password (OTP) authentication server over a network, and managing access to the security domain, the security key device comprising:
    an interface unit configured to provide an interface with the authentication device installed at the security domain;
    an module configured to communicate with the authentication device through the interface unit, wherein the OTP module comprises
    a non-transitory computer-readable storage medium configured to store at least one pair of OTP Seed Identification (ID) and OTP Algorithm ID generated in the security service device and received from the security service device;
    an OTP generation unit configured to receive an OTP request message including the OTP Seed ID and OTP Algorithm ID sent by the authentication device, and in response, generate a OTP, by using the OTP Seed ID and OTP Algorithm ID included in the OTP request message, and using time information or event information corresponding to an accessing of the security domain, and provide the OTP and a security key identification information to the authentication device,
wherein
the authentication device transmits a first OTP authentication request message that includes the OTP and the security key identification information to the security service device;
the security service device requests the OTP authentication server to authenticate the OTP generated by the security key device when a holder associated with the security key device is registered to have access to the security domain based on the security key identification information, and retrieves in its storage a corresponding OTP seed ID and Algorithm ID, generates a second OTP authentication request message including the OTP generated by the security key device, the retrieved corresponding OTP seed ID and algorithm id, transmitted to the OTP authentication server;
the OTP authentication server generates from the second OTP authentication request message a second OTP, determines whether the second OTP matches the OTP generated by the security key device and sends an authentication result to the authentication device through the first security device, the authentication device granting or denying the holder of the security key device access to the security domain based on the authentication result.

2. The security key device according to claim 1, wherein the OTP Algorithm ID is stored in the non-transitory computer-readable storage medium, and the OTP Algorithm ID is information which is mapped on the OTP Seed ID.

3. The security key device according to claim 1, wherein the OTP Algorithm ID is configured, executed by the processor, to identify the OTP algorithm which generates the OTP according to the time information or event information.

4. The security key device according to claim 1, wherein the OTP request message comprises at least one or more time information.

5. The security key device according to claim 1, wherein the security service device updates the OTP by using the OTP Seed ID and OTP Algorithm ID corresponding to the second the OTP request message at every reception of the first authentication request message transmitted from the authentication device.

6. The security key device according to claim 5, wherein the security service device is configured to generate the OTP Seed ID and OTP Algorithm ID that is supplied to the authentication server which interlocks with the security service device.

7. The security key device according to claim 6, wherein the security service device, executed by a processor, is configured to manage the security key identification information, or the security key holders' access records or details of attempts to enter a security domain.

8. The security key device according to claim 1, wherein the OTP module further comprises a history management unit which, executed by a processor, is configured to manage the access attempts to the security domain.

9. The security key device according to claim 1, further comprising:
a fingerprint authentication module, executed by a processor, is configured to authenticate separately from the OTP module,
wherein the fingerprint authentication module comprises
a fingerprint authentication unit configured to perform fingerprint authentication; and
a power control unit configured selectively to activate the OTP module upon detection of success of the fingerprint authentication, or not to activate the OTP module upon detection of failure of the fingerprint authentication.

10. The security key device according to claim 1,
wherein the security domain comprises at least one of a physical security domain and a logical security domain.

11. The security key device according to claim 1,
wherein the OTP request message further comprises security service identification information, and
the OTP generating unit is configured to generate the OTP only if the security service identification information is the same as the security key identification information which is registered in the non-transitory computer-readable storage medium.

12. The security key device according to claim 11,
wherein the security service identification information is equivalent to the Uniform Resource Locator (URL) or IP address of the security service device that interlocks with the authentication server.

13. A security system comprising a security key device, an authentication device, a security service device and a one-time password (OTP) authentication device in communications over a network, the security system comprising:
the security service device generating an OTP seed identifier (ID) and OTP algorithm ID;
the security key device including:
a non-transitory computer-readable storage medium configured to store at least one pair of OTP Seed Identification (ID) and OTP algorithm ID received from the security service device;
an interface unit configured to provide an interface to communicate with an authentication device;
an OTP generation unit configured to receive an OTP request message including OTP Seed ID and OTP Algorithm ID, sent by the authentication device and in response, generate a OTP by using the OTP Seed ID and OTP Algorithm ID included in the OTP request message, and using time information or event information corresponding to an accessing of the security domain, and provide the OTP and a security key identification information to the authentication device;
wherein,
the authentication device transmits a first OTP authentication request message that includes the OTP and the security key identification information to the security service device;
the security service device requests the OTP authentication server to authenticate the OTP generated by the security key device when a holder associated with the security key device is registered to have access to the security domain based on the security key identification information, and retrieves in its storage a corresponding OTP seed ID and Algorithm ID, generates a second OTP authentication request message including the OTP generated by the security key device, the retrieved corresponding OTP seed ID and algorithm ID, transmitted to the OTP authentication server;
the OTP authentication server, in response to receiving the second OTP authentication request message generates from the second OTP authentication request message a second OTP, determines whether the second OTP matches the OTP generated by the security key device and sends an authentication result to the authentication device through the first security service device, the authentication device granting or denying the holder of the security key device access to the security domain based on the authentication result.

14. The security service system, according to claim 13, wherein the ID generating unit is configured to generate different OTP Seed ID and OTP Algorithm ID associated with multiple security domains.

* * * * *